(12) United States Patent
Rhoads

(10) Patent No.: US 8,103,053 B2
(45) Date of Patent: *Jan. 24, 2012

(54) METHOD AND APPARATUS FOR ASSOCIATING IDENTIFIERS WITH CONTENT

(75) Inventor: Geoffrey B. Rhoads, West Linn, OR (US)

(73) Assignee: Digimarc Corporation, Beaverton, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/821,956

(22) Filed: Jun. 23, 2010

(65) Prior Publication Data

US 2010/0260375 A1 Oct. 14, 2010

Related U.S. Application Data

(60) Division of application No. 12/247,021, filed on Oct. 7, 2008, now Pat. No. 7,747,038, which is a continuation of application No. 11/673,931, filed on Feb. 12, 2007, now Pat. No. 7,433,491, which is a division of application No. 11/060,975, filed on Feb. 17, 2005, now Pat. No. 7,177,443, which is a continuation of application No. 10/003,717, filed on Oct. 22, 2001, now Pat. No. 6,920,232, which is a continuation of application No. 09/434,757, filed on Nov. 4, 1999, now Pat. No. 6,307,949.

(51) Int. Cl.
*H04K 1/00* (2006.01)
(52) U.S. Cl. ........................ 382/100; 382/232
(58) Field of Classification Search .................. 382/100, 382/232; 713/176; 370/527, 529; 380/210, 380/287, 54

See application file for complete search history.

(56) References Cited

U.S. PATENT DOCUMENTS

| 4,389,671 A | 6/1983 | Posner et al. ................. 358/124 |
| 4,750,173 A | 6/1988 | Bluthgen ..................... 370/ 111 |
| 4,939,515 A | 7/1990 | Adelson .......................... 341/51 |
| 5,134,496 A | 7/1992 | Schwab et al. ................ 358/335 |
| 5,136,436 A | 8/1992 | Kahlman ........................ 360/40 |
| 5,146,457 A | 9/1992 | Veldhuis et al. .............. 370/111 |
| 5,161,210 A | 11/1992 | Druyvesteyn et al. ............ 395/2 |

(Continued)

FOREIGN PATENT DOCUMENTS

EP 581317 A2 2/1994

(Continued)

OTHER PUBLICATIONS

Langelaar et al., "Real-time Labeling Methods for MPEG Compressed Video", Proc. 18th Symp. on Information Theory in the Benelux, May 1997, pp. 25-32.*

(Continued)

*Primary Examiner* — Andrew W Johns

(57) ABSTRACT

Watermark detection in an image or the like can be optimized by exploiting the innate biases in the image to emphasize the watermark signal. The watermark signal can be trial-located with different origins in the image to find one that yields improved results. Similarly, the image can be processed (e.g., by changing resolution, rotation, or compression) so as to change the innate biases to better reinforce the watermark signal. Compression of an image can be done in accordance with a desired identifier, with the compressor deciding which image components to retain and which to discard based, in part, on the identifier that is to be associated with the image. The techniques are also applicable to other forms of content, such as audio. A variety of other arrangements are also detailed.

20 Claims, 3 Drawing Sheets

U.S. PATENT DOCUMENTS

| | | | |
|---|---|---|---|
| 5,530,655 A | 6/1996 | Lokhoff et al. | 364/514 A |
| 5,646,997 A | 7/1997 | Barton | 380/23 |
| 5,649,054 A | 7/1997 | Oomen et al. | 382/2.38 |
| 5,652,626 A | 7/1997 | Kawakami et al. | 348/463 |
| 5,687,191 A | 11/1997 | Lee et al. | 375/216 |
| 5,721,788 A | 2/1998 | Powell et al. | 382/100 |
| 5,778,102 A | 7/1998 | Sandford, II et al. | 382/251 |
| 5,809,139 A | 9/1998 | Girod et al. | 380/5 |
| 5,848,155 A | 12/1998 | Cox | 380/4 |
| 5,862,260 A | 1/1999 | Rhoads | 382/232 |
| 5,901,178 A | 5/1999 | Lee et al. | 375/240 |
| 5,915,027 A | 6/1999 | Cox et al. | 380/54 |
| 5,930,369 A | 7/1999 | Cox et al. | 380/54 |
| 5,933,798 A | 8/1999 | Linnartz | 702/191 |
| 5,960,081 A | 9/1999 | Vynne et al. | 380/10 |
| 5,960,398 A | 9/1999 | Fuchigami et al. | 704/270 |
| 6,037,984 A | 3/2000 | Isnardi et al. | 348/403 |
| 6,061,451 A | 5/2000 | Muratani et al. | 380/201 |
| 6,078,664 A | 6/2000 | Moskowitz et al. | 380/28 |
| 6,108,434 A | 8/2000 | Cox et al. | 382/100 |
| 6,122,403 A | 9/2000 | Rhoads | 382/233 |
| 6,128,736 A | 10/2000 | Miller | 713/176 |
| 6,208,745 B1 | 3/2001 | Florencio et al. | 382/100 |
| 6,229,924 B1 | 5/2001 | Rhoads et al. | 382/232 |
| 6,266,419 B1 | 7/2001 | Lacy et al. | 380/269 |
| 6,266,430 B1 | 7/2001 | Rhoads | 382/100 |
| 6,272,634 B1 | 8/2001 | Tewfik et al. | 713/176 |
| 6,285,774 B1 * | 9/2001 | Schumann et al. | 382/100 |
| 6,307,949 B1 | 10/2001 | Rhoads | 382/100 |
| 6,311,214 B1 | 10/2001 | Rhoads | 709/217 |
| 6,332,194 B1 | 12/2001 | Bloom et al. | 713/176 |
| 6,359,985 B1 | 3/2002 | Koch et al. | 380/54 |
| 6,381,341 B1 | 4/2002 | Rhoads | 382/100 |
| 6,385,329 B1 | 5/2002 | Sharma et al. | 382/100 |
| 6,404,898 B1 | 6/2002 | Rhoads | 382/100 |
| 6,408,082 B1 | 6/2002 | Rhoads et al. | 382/100 |
| 6,421,070 B1 | 7/2002 | Ramos et al. | 345/763 |
| 6,424,725 B1 | 7/2002 | Rhoads et al. | 382/100 |
| 6,424,726 B2 | 7/2002 | Nakano et al. | 382/100 |
| 6,516,079 B1 | 2/2003 | Rhoads et al. | 382/100 |
| 6,522,770 B1 | 2/2003 | Seder et al. | 382/100 |
| 6,535,617 B1 | 3/2003 | Hannigan et al. | 382/100 |
| 6,542,927 B2 | 4/2003 | Rhoads | 709/217 |
| 6,553,129 B1 | 4/2003 | Rhoads | 282/100 |
| 6,567,533 B1 | 5/2003 | Rhoads | 382/100 |
| 6,580,808 B2 | 6/2003 | Rhoads | 382/100 |
| 6,590,996 B1 | 7/2003 | Reed et al. | 382/100 |
| 6,611,607 B1 | 8/2003 | Davis et al. | 382/100 |
| 6,614,914 B1 | 9/2003 | Rhoads et al. | 382/100 |
| 6,647,128 B1 | 11/2003 | Rhoads | 382/100 |
| 6,647,129 B2 | 11/2003 | Rhoads | 382/100 |
| 6,647,130 B2 | 11/2003 | Rhoads | 382/100 |
| 6,650,761 B1 | 11/2003 | Rodriguez et al. | 382/100 |
| 6,681,028 B2 | 1/2004 | Rodriguez et al. | 382/100 |
| 6,681,029 B1 | 1/2004 | Rhoads | 382/100 |
| 6,694,042 B2 | 2/2004 | Seder et al. | 382/100 |
| 6,694,043 B2 | 2/2004 | Seder et al. | 382/100 |
| 6,700,990 B1 | 3/2004 | Rhoads | 382/100 |
| 6,700,995 B2 | 3/2004 | Reed | 382/100 |
| 6,704,869 B2 | 3/2004 | Rhoads et al. | 713/176 |
| 6,718,046 B2 | 4/2004 | Reed et al. | 382/100 |
| 6,718,047 B2 | 4/2004 | Rhoads | 382/100 |
| 6,721,440 B2 | 4/2004 | Reed et al. | 382/100 |
| 6,760,463 B2 | 7/2004 | Rhoads | 382/100 |
| 6,763,123 B2 | 7/2004 | Reed et al. | 382/100 |
| 6,768,809 B2 | 7/2004 | Rhoads et al. | 382/100 |
| 6,775,392 B1 | 8/2004 | Rhoads | 382/100 |
| 6,798,894 B2 | 9/2004 | Rhoads | 382/100 |
| 6,813,366 B1 | 11/2004 | Rhoads | 382/100 |
| 6,834,345 B2 | 12/2004 | Bloom et al. | 713/176 |
| 6,879,701 B1 | 4/2005 | Rhoads | 382/100 |
| 6,917,724 B2 | 7/2005 | Seder et al. | 382/321 |
| 6,920,232 B2 | 7/2005 | Rhoads | 382/100 |
| 6,947,571 B1 | 9/2005 | Rhoads et al. | 382/100 |
| 6,975,746 B2 | 12/2005 | Davis et al. | 382/100 |
| 6,988,202 B1 | 1/2006 | Rhoads et al. | 713/176 |
| 6,996,252 B2 | 2/2006 | Reed et al. | 382/100 |
| 7,003,731 B1 | 2/2006 | Rhoads et al. | 715/768 |
| 7,024,016 B2 | 4/2006 | Rhoads et al. | 382/100 |
| 7,027,614 B2 | 4/2006 | Reed | 382/100 |
| 7,035,427 B2 | 4/2006 | Rhoads | 382/100 |
| 7,044,395 B1 | 5/2006 | Davis et al. | 235/494 |
| 7,051,086 B2 | 5/2006 | Rhoads et al. | 709/219 |
| 7,054,465 B2 | 5/2006 | Rhoads | 382/100 |
| 7,062,069 B2 | 6/2006 | Rhoads | 382/100 |
| 7,095,871 B2 | 8/2006 | Jones et al. | 382/100 |
| 7,111,170 B2 | 9/2006 | Rhoads et al. | 713/176 |
| 7,113,614 B2 | 9/2006 | Rhoads | 382/100 |
| 7,139,408 B2 | 11/2006 | Rhoads et al. | 382/100 |
| 7,158,654 B2 | 1/2007 | Rhoads | 382/100 |
| 7,164,780 B2 | 1/2007 | Brundage et al. | 382/100 |
| 7,171,016 B1 | 1/2007 | Rhoads | 382/100 |
| 7,174,031 B2 | 2/2007 | Rhoads et al. | 382/107 |
| 7,177,443 B2 * | 2/2007 | Rhoads | 382/100 |
| 7,213,757 B2 | 5/2007 | Jones et al. | 235/462.01 |
| 7,224,819 B2 | 5/2007 | Levy et al. | 382/100 |
| 7,248,717 B2 | 7/2007 | Rhoads | 382/100 |
| 7,261,612 B1 | 8/2007 | Hannigan et al. | 446/175 |
| 7,305,104 B2 | 12/2007 | Carr et al. | 382/100 |
| 7,308,110 B2 | 12/2007 | Rhoads | 382/100 |
| 7,313,251 B2 | 12/2007 | Rhoads | 382/100 |
| 7,319,775 B2 | 1/2008 | Sharma et al. | 382/100 |
| 7,330,564 B2 | 2/2008 | Brundage et al. | 382/100 |
| 7,369,678 B2 | 5/2008 | Rhoads | 382/100 |
| 7,377,421 B2 | 5/2008 | Rhoads | 235/375 |
| 7,391,880 B2 | 6/2008 | Reed et al. | 382/100 |
| 7,406,214 B2 | 7/2008 | Rhoads et al. | 382/289 |
| 7,424,131 B2 | 9/2008 | Alattar et al. | 382/100 |
| 7,427,030 B2 | 9/2008 | Jones et al. | 235/491 |
| 7,433,491 B2 | 10/2008 | Rhoads | 382/100 |
| 7,444,000 B2 | 10/2008 | Rhoads | 382/100 |
| 7,444,392 B2 | 10/2008 | Rhoads et al. | 709/219 |
| 7,450,734 B2 | 11/2008 | Rodriguez et al. | 382/100 |
| 7,460,726 B2 | 12/2008 | Levy et al. | 382/240 |
| 7,466,840 B2 | 12/2008 | Rhoads | 382/100 |
| 7,486,799 B2 | 2/2009 | Rhoads | 382/100 |
| 7,502,759 B2 | 3/2009 | Hannigan et al. | 705/51 |
| 7,508,955 B2 | 3/2009 | Carr et al. | 382/100 |
| 7,515,733 B2 | 4/2009 | Rhoads | 382/100 |
| 7,536,034 B2 | 5/2009 | Rhoads et al. | 382/107 |
| 7,537,170 B2 | 5/2009 | Reed et al. | 235/494 |
| 7,545,952 B2 | 6/2009 | Brundage et al. | 382/100 |
| 7,564,992 B2 | 7/2009 | Rhoads | 382/100 |
| RE40,919 E | 9/2009 | Rhoads | 382/232 |
| 7,602,978 B2 | 10/2009 | Levy et al. | 382/232 |
| 7,628,320 B2 | 12/2009 | Rhoads | 235/375 |
| 7,643,649 B2 | 1/2010 | Davis et al. | 382/100 |
| 7,650,009 B2 | 1/2010 | Rhoads | 382/100 |
| 7,653,210 B2 | 1/2010 | Rhoads | 382/100 |
| 7,657,058 B2 | 2/2010 | Sharma | 382/100 |
| 7,685,426 B2 | 3/2010 | Ramos et al. | 713/176 |
| 7,693,300 B2 | 4/2010 | Reed et al. | 382/100 |
| 7,697,719 B2 | 4/2010 | Rhoads | 382/100 |
| 7,711,143 B2 | 5/2010 | Rhoads | 382/100 |
| 7,738,673 B2 | 6/2010 | Reed | 382/100 |
| 7,747,038 B2 | 6/2010 | Rhoads | 382/100 |
| 7,751,588 B2 | 7/2010 | Rhoads | 382/100 |
| 7,751,596 B2 | 7/2010 | Rhoads | 382/115 |
| 7,756,290 B2 | 7/2010 | Rhoads | 382/100 |
| 7,760,905 B2 | 7/2010 | Rhoads et al. | 382/100 |
| 7,762,468 B2 | 7/2010 | Reed et al. | 235/491 |
| 7,787,653 B2 | 8/2010 | Rhoads | 382/100 |
| 7,792,325 B2 | 9/2010 | Rhoads et al. | 382/100 |
| 7,822,225 B2 | 10/2010 | Alattar | 382/100 |
| 7,837,094 B2 | 11/2010 | Rhoads | 235/375 |
| 7,945,781 B1 | 5/2011 | Rhoads | 713/176 |
| 7,949,147 B2 | 5/2011 | Rhoads et al. | 382/100 |
| 7,953,270 B2 | 5/2011 | Rhoads | 382/145 |
| 7,953,824 B2 | 5/2011 | Rhoads et al. | 709/219 |
| 7,957,553 B2 | 6/2011 | Ellingson et al. | 382/100 |
| 7,961,949 B2 | 6/2011 | Levy et al. | 382/190 |
| 7,970,166 B2 | 6/2011 | Carr et al. | 382/100 |
| 7,970,167 B2 | 6/2011 | Rhoads | 382/100 |
| 2001/0034705 A1 | 10/2001 | Rhoads et al. | 705/39 |
| 2001/0055407 A1 | 12/2001 | Rhoads | 382/100 |
| 2002/0009208 A1 | 1/2002 | Alattar et al. | 382/100 |
| 2002/0131076 A1 | 9/2002 | Davis | 358/1.15 |

| | | | |
|---|---|---|---|
| 2002/0176003 A1 | 11/2002 | Seder et al. | 348/207.1 |
| 2002/0186886 A1 | 12/2002 | Rhoads | 382/232 |
| 2002/0196272 A1 | 12/2002 | Ramos et al. | 345/738 |
| 2003/0040957 A1 | 2/2003 | Rhoads et al. | 705/14 |
| 2003/0105730 A1 | 6/2003 | Davis et al. | 705/407 |
| 2003/0130954 A1 | 7/2003 | Carr et al. | 705/60 |
| 2004/0005093 A1 | 1/2004 | Rhoads | 382/232 |
| 2004/0190750 A1 | 9/2004 | Rodriguez et al. | 382/100 |
| 2004/0240704 A1 | 12/2004 | Reed | 382/100 |
| 2004/0264733 A1 | 12/2004 | Rhoads et al. | 382/100 |
| 2005/0041835 A1 | 2/2005 | Reed et al. | 382/100 |
| 2005/0058318 A1 | 3/2005 | Rhoads | 382/100 |
| 2005/0192933 A1 | 9/2005 | Rhoads et al. | 707/2 |
| 2006/0013435 A1 | 1/2006 | Rhoads | 382/100 |
| 2006/0041591 A1 | 2/2006 | Rhoads | 707/104.1 |
| 2006/0251291 A1 | 11/2006 | Rhoads | 382/100 |
| 2007/0055884 A1 | 3/2007 | Rhoads | 713/176 |
| 2007/0108287 A1 | 5/2007 | Davis et al. | 235/462.01 |
| 2007/0276841 A1 | 11/2007 | Rhoads et al. | 707/10 |
| 2007/0276928 A1 | 11/2007 | Rhoads et al. | 709/219 |
| 2008/0121728 A1 | 5/2008 | Rodriguez | 235/494 |
| 2008/0133555 A1 | 6/2008 | Rhoads et al. | 707/100 |
| 2008/0292134 A1 | 11/2008 | Sharma et al. | 382/100 |
| 2009/0012944 A1 | 1/2009 | Rodriguez et al. | 707/3 |
| 2009/0125475 A1 | 5/2009 | Rhoads et al. | 706/60 |
| 2009/0286572 A1 | 11/2009 | Rhoads et al. | 455/557 |
| 2010/0045816 A1 | 2/2010 | Rhoads | 348/222.1 |
| 2010/0062819 A1 | 3/2010 | Hannigan et al. | 463/9 |
| 2010/0172540 A1 | 7/2010 | Davis et al. | 382/100 |
| 2010/0198941 A1 | 8/2010 | Rhoads | 709/217 |
| 2010/0260375 A1 | 10/2010 | Rhoads | 382/100 |
| 2011/0007936 A1 | 1/2011 | Rhoads | 382/100 |
| 2011/0026777 A1 | 2/2011 | Rhoads et al. | 382/107 |
| 2011/0051998 A1 | 3/2011 | Rhoads | 382/100 |
| 2011/0062229 A1 | 3/2011 | Rhoads | 235/375 |
| 2011/0091066 A1 | 4/2011 | Alattar | 382/100 |

FOREIGN PATENT DOCUMENTS

| | | |
|---|---|---|
| WO | WO98/02864 A1 | 1/1998 |
| WO | WO98/27510 A1 | 6/1998 |
| WO | WO02/60182 A1 | 8/2002 |

OTHER PUBLICATIONS

Langelaar et al., "Real-Time Labeling of MPEG-2 Compressed Video", Journal of Visual Communication and Image Representation, vol. 9, No. 4, Dec. 1998, pp. 256-270.*

U.S. Appl. No. 09/343,101, filed Jun. 29, 1999, Bruce L. Davis, et al.
U.S. Appl. No. 09/343,104, filed Jun. 29, 1999, Tony F. Rodriguez, et al.
U.S. Appl. No. 09/413,117, filed Oct. 6, 1999, Geoffrey B. Rhoads.
U.S. Appl. No. 09/482,749, filed Jan. 13, 2000, Geoffrey B. Rhoads.
U.S. Appl. No. 09/507,096, filed Feb. 17, 2000, Geoffrey B. Rhoads, et al.
U.S. Appl. No. 09/552,998, filed Apr. 19, 2000, Tony F. Rodriguez, et al.
U.S. Appl. No. 09/567,405, filed May 8, 2000, Geoffrey B. Rhoads, et al.
U.S. Appl. No. 09/629,649, filed Aug. 1, 2000, J. Scott Carr, et al.
U.S. Appl. No. 09/633,587, filed Aug. 7, 2000 Geoffrey B. Rhoads, et al.
U.S. Appl. No. 09/689,289, filed Oct. 11, 2000, Geoffrey B. Rhoads, et al.
U.S. Appl. No. 09/697,015, filed Oct. 25, 2000, Bruce L Davis, et al.
U.S. Appl. No. 09/697,009, filed Oct. 25, 2000, Bruce L. Davis, et al.
U.S. Appl. No. 13/084,981, filed Apr. 12, 2011, Geoffrey B. Rhoads.
"Access Control and Copyright Protection for Images, Workpackage 8: Watermarking," Jun. 1995, 46 pages.
Anderson, "Stretching the Limits of Steganography," Proc. First Int. Workshop on Information Hiding, LNCS vol. 1174, May/Jun. 1996, pp. 39-48.
Aura, "Practical Invisibility in Digital Communication," Proc. First Int. Workshop on Information Hiding, LNCS vol. 1174, May/Jun. 1996, pp. 265-278.
Bors et al., "Image Watermarking Using DCT Domain Constraints," Proc. IEEE Int. Conf. on Image Processing, vol. 3, Sep. 1996, pp. 231-234.
Burgett et al., "A Novel Method for Copyright Labeling Digitized Image Data," Sep. 1994, 12 pages.
Chen, "Dither Modulation: A New Approach to Digital Watermarking and Information Embedding," Proc of SPIE, vol. 3657, 1999.
Chou, "On the Duality Between Distributed Source Coding and Data Hiding," 33rd Asilomar Conference on Signals, System and Computers, pp. 1503-1507, 1999.
Cox et al., "Watermarking as communications with Side Information," Proc. of the IEEE, 87,7,1127-1141, 1999.
Dittmann, Jana et al., "Robust MPEG Video Watermarking Technologies", ACM Multimedia '98, Bristol, UK, 1998, pp. 71-80.
Hartung et al., Digital Watermarking of Raw and Compressed Video, Proc. SPIE 2952, Digital Compression Technologies and Systems for Video Communications, Oct. 1996, pp. 205-213.
Holliman et al., "Adaptive Public Watermarking of DCT-Based Compressed Images," SPIE vol. 3312, Dec. 1997, pp. 284-295.
JPEG Group's, JPEG Software (release 4), FTP.CSUA.BEREKELEY.EDU/PUB/CYPHERPUNKS/APPLICATIONS/JSTEG/JPEG.ANNOUNCEME-NT.GZ, Jun. 1993, 2 pages.
Kawaguchi et al., "Principle and Applications of BPCS-Steganography," Proc. SPIE vol. 3528, Nov. 1998, pp. 464-473.
Koch et al., "Copyright Protection for Multimedia Data," Proc. of the Int. Conf. on Digital Media and Electronic Publishing, Leeds, U.K., Dec. 1994, 15 pages.
Komatsu et al., "A Proposal on Digital Watermark in Document Image Communication and Its Application to Realizing a Signature," Electronics and Communications in Japan, Part 1, vol. 73, No. 5, Nov. 1990, pp. 22-33.
Langelaar et al., "Copy Protection for Multimedia Data based on Labeling Techniques," Jun. 1996, 9 pages.
Langelaar et al., "Robust Labeling Methods for Copy Protection of Images," Proc. SPIE Electronic Imaging '97: Storage and Retrieval of Image and Video Databases V, Feb. 1997, pp. 298-309.
Langelaar et al., "Robust Labeling Methods for copy Protection of Images," Proc. SPIE Electronic Imaging, Feb. 1997, pp. 298-309.
Langelaar et al., "Watermarking by DCT Coefficient Removal: A Statistical Approach to Optimal Parameter Setting," Proc. SPIE vol. 3657, Jan. 1999, pp. 2-13.
Matsui et al., "Video-Steganography: How to Secretly Embed a Signature in a Picture," Jan. 1994, pp. 187-205.
Ogihara et al., "Data Embedding into Pictorial Images with Less Distortion Using Discrete Cosine Transform," Proc. of ICPR 96, IEEE, pp. 675-679.
Oomen et al., "A Variable Bit Rate Buried Data Channel," J. Audio Eng. Soc, vol. 43, No. 1/2, Jan./Feb. 1995.

* cited by examiner

METHOD AND APPARATUS FOR ASSOCIATING IDENTIFIERS WITH CONTENT

CROSS-REFERENCE TO RELATED APPLICATIONS

This application is a division of application Ser. No. 12/247,021 (filed Oct. 7, 2008, to issue as U.S. Pat. No. 7,747,038), which is a continuation of application Ser. No. 11/673,931, filed Feb. 12, 2007 (now U.S. Pat. No. 7,433,491), which is a division of application Ser. No. 11/060,975, filed Feb. 17, 2005 (now U.S. Pat. No. 7,177,443), which is a continuation of application Ser. No. 10/003,717, filed Oct. 22, 2001 (now U.S. Pat. No. 6,920,232), which is a continuation of application Ser. No. 09/434,757, filed Nov. 4, 1999 (now U.S. Pat. No. 6,307,949).

The present subject matter is related to that disclosed in the assignee's other patents and applications, including U.S. Pat. No. 5,862,260, and applications Ser. No. 09/074,034 (now U.S. Pat. No. 6,449,377), Ser. No. 09/127,502 (now U.S. Pat. No. 6,345,104), Ser. No. 09/164,859 (now U.S. Pat. No. 6,374,036), Ser. No. 09/292,569 (now abandoned in favor of continuing application Ser. No. 10/379,393, which has issued as U.S. Pat. No. 7,263,203), Ser. No. 09/314,648 (now U.S. Pat. No. 6,681,028), Ser. No. 09/342,675 (now U.S. Pat. No. 6,400,827), and Ser. No. 09/343,104 (now abandoned in favor of continuing application Ser. No. 10/764,430).

BACKGROUND

Watermarking is a well-developed art, with a great variety of techniques. Generally, all vary an original signal (corresponding, e.g., to audio or image data—video being considered a form of image data) so as to encode auxiliary data without apparent alteration of the original signal. Upon computer analysis, however, the auxiliary data can be discerned and read. (For expository convenience, the following discussion focuses on image data, although the same techniques are generally applicable across all watermarking applications.)

A problem inherent in all watermarking techniques is the effect of the underlying image signal. In this context the underlying image signal—although the intended signal for human perception—acts as noise for purposes of decoding of the watermark signal. In most cases, the energy of the image signal far exceeds that of the watermark signal, making watermark detection an exercise in digging out a weak signal amidst a much stronger signal. If the encoded image has been degraded, e.g., by scanning/printing, or lossy compression/decompression, the process becomes still more difficult. As watermarks become increasingly prevalent (e.g., for device control, such as anti-duplication features in reproduction systems), the importance of this problem escalates.

DETAILED DESCRIPTION

Figure 1:
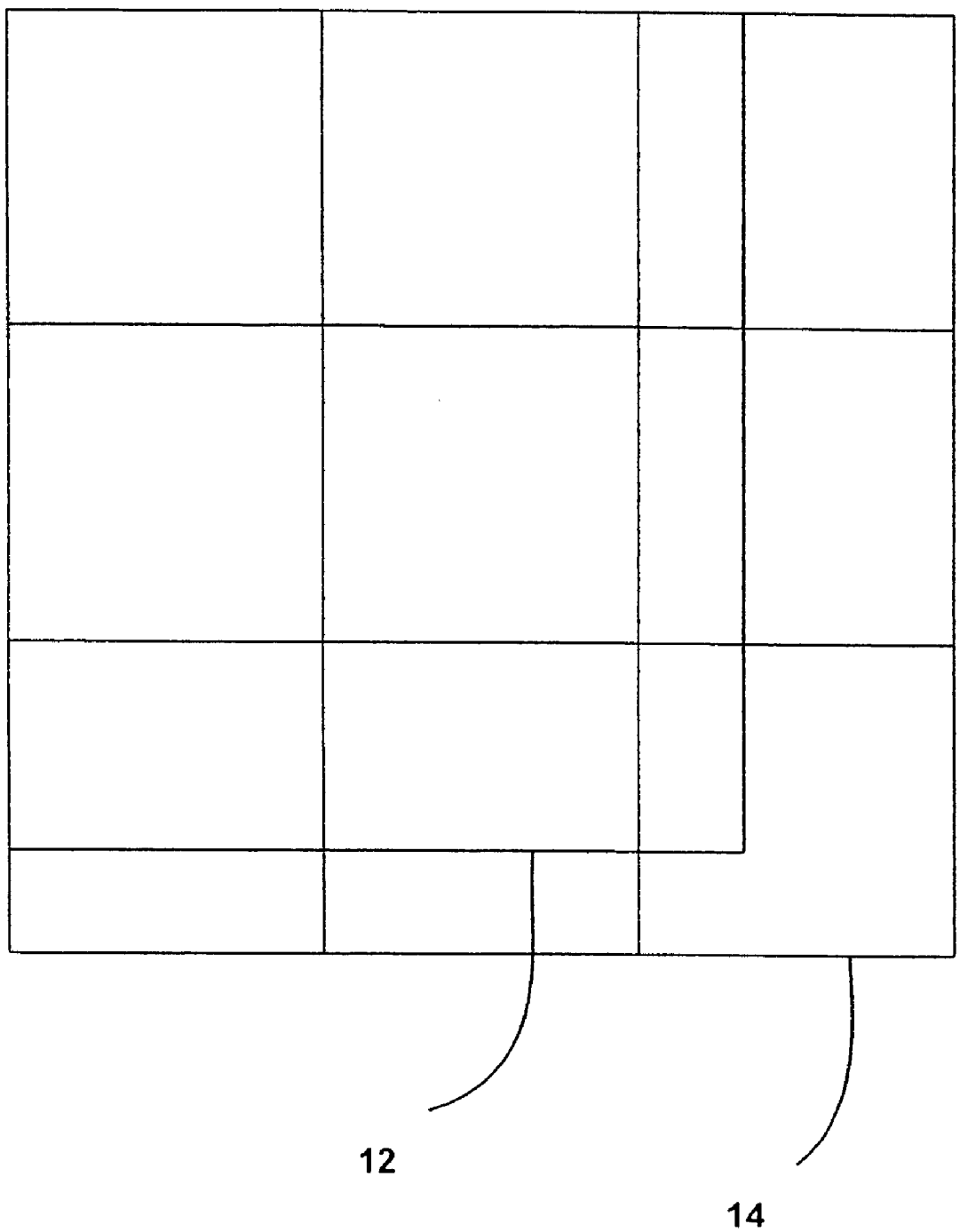
FIG. 1 shows how an image may be tiled with a watermark.
Figure 2:
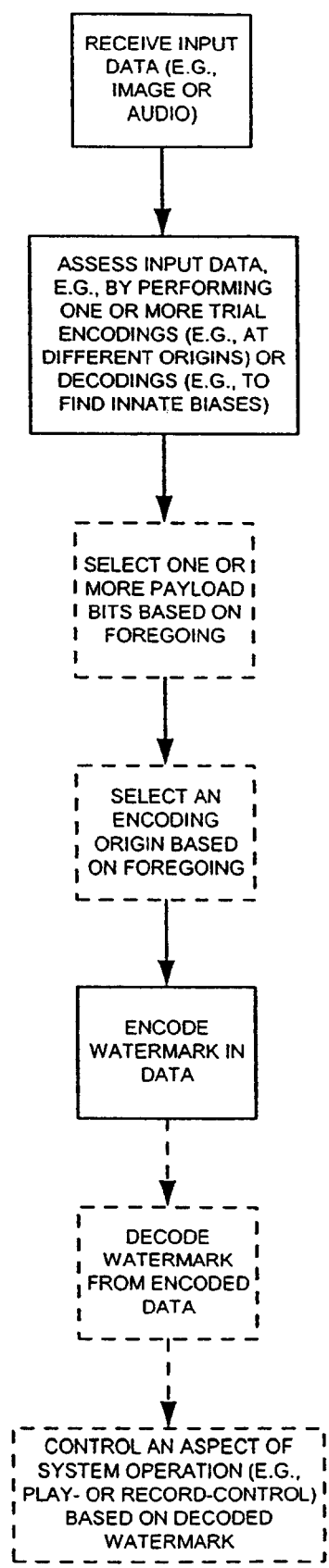
FIGS. 2 and 3 are flow charts illustrating methods according to different embodiments.
Figure 3:
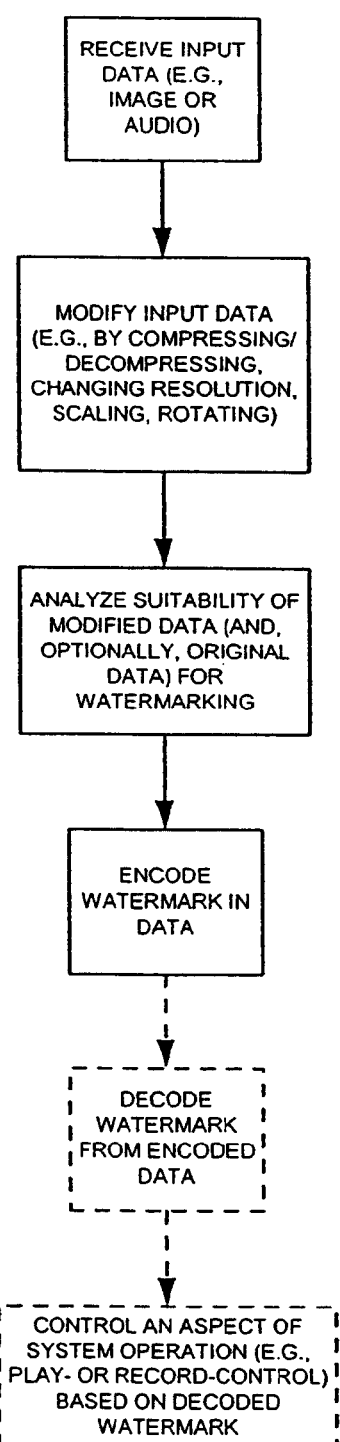

To mitigate the problem of detecting a watermark signal in the presence of a much-stronger image signal, certain choices are made early in the process—at the embedding operation.

The "noise" introduced by the image signal doesn't always hurt the detection process. Sometimes innate biases in pixel values, or other image characteristics (e.g., DCT, wavelet, or other transform coefficients), can actually serve to accentuate the watermark signal and thereby simplify detection.

Starting with a perhaps overly simple case, consider an image prior to watermark encoding. If the un-encoded image is analyzed for the presence of a watermark, none should be found. However, there are cases in which the innate image characteristics sufficiently mimic a watermark signal that a phantom watermark payload may nonetheless be decoded. If the application permits, the user may then encode the image with this watermark payload. This encoding just accentuates the phantom data signal coincidentally present in the image. Even if all of the added watermark energy is somehow thereafter lost, the watermark may still be detectable.

Most watermark decoding algorithms are designed to guard against detection of phantom watermarks in un-encoded images. For example, the algorithms may look for checksum bits in the watermark payload; if the payload bits don't correspond as expected to the checksum, the decoder may simply report that no watermark is detected. Other algorithms may employ some confidence metric for each of the decoded bits (e.g., signal-to-noise ratio). Unless the confidence metric for all the decoded bits exceeds a threshold value, the decoder may again report that no watermark is detected.

In applying the principles detailed in this specification, it is generally desirable to disable or circumvent mechanisms that guard against detection of phantom data so as to essentially force the decoder to make its best guess of what the watermark payload is—assuming there is a watermark present. In the case just discussed, this would involve circumventing checksum checks, and lowering the detection confidence thresholds until watermark data is discerned from the un-encoded image.

The approach just-discussed assumes that the image proprietor has total freedom in selection of the watermark payload. This may be the case when the image is being secretly marked with an identifier whose purpose is to identify unauthorized dissemination of the image—in such case, the identifier can be arbitrary. More commonly, however, the watermark payload data cannot be so arbitrarily selected.

A variant of the foregoing considers the phantom presence of specific watermark payload bits in the un-encoded image. Many watermark encoding techniques essentially encode each payload bit position separately (e.g., each bit corresponds to specific image pixels or regions, or to specific transform coefficients). In such arrangements, the un-encoded image may mimic encoding of certain payload bits, and be indeterminate (or counter) as to others. Those bits for which the image has an innate bias may be incorporated into the watermark payload; the other bits can be set as may befit the application. Again, the image is then watermarked in accordance with the thus-determined payload.

(The notion that an image may have a preference for certain watermark payload data is expressed in various of my earlier patents, e.g., in U.S. Pat. No. 5,862,260, as follows:

The basic idea is that a given input bump has a pre-existing bias relative to whether one wishes to encode a '1' or a '0' at its location, which to some non-trivial extent is a function of the reading algorithms which will be employed, whose (bias) magnitude is semi-correlated to the "hiding potential" of the y-axis, and, fortunately, can be used advantageously as a variable in determining what magnitude of a tweak value is assigned to the bump in question. The concomitant basic idea is that when a bump is already your friend (i.e. its bias relative to its neighbors already tends towards the desired delta value), then don't change it much. Its natural state already provides the delta energy needed for decoding, without altering the localized image value much, if at all. Conversely, if a bump is initially your enemy (i.e. its bias relative to its neighbors tends away from the delta sought to be imposed by the encoding), then change it an exaggerated amount. This later operation tends to reduce the excursion of this point relative to its neighbors, making the point less visibly conspicuous (a highly localized blurring operation), while providing additional energy detectable when decoding. These two cases are termed "with the grain" and "against the grain" herein.)

Again, the foregoing example assumes that the user has flexibility in selecting at least certain of the payload bits so as to exploit watermark biases in the image itself. Commonly, however, this will not be the case. In such cases, other approaches can be used.

One approach is to vary the origin of the encoded watermark data within the image. "Origin" is a concept whose precise definition depends on the particular encoding technique used. In the watermarking techniques disclosed in the commonly-owned patents and applications, the watermarking is performed on a tiled basis (FIG. 1), with a square watermark data block 14 (e.g., 128×128 pixels) being repetitively applied across the image 12. Heretofore, the upper left hand pixel of the first data block is made coincident with the upper left hand pixel in the image (the latter is the origin). Thereafter, the watermark block is tiled horizontally and vertically across the image, repeating every 128 pixels. At the right and bottom edges, the tiled data block may overlie the edge of the image, with some of the block lost off the edges. This arrangement is shown in FIG. 1.

The assignment of the origin to the upper left hand corner of the image is a matter of convention and simplicity more than design. The origin can be moved to the next pixel to the right, or the next pixel down, without impairing the watermark's operation. (The decoding technique detailed in the commonly-owned patents and applications determines the location of the origin by reference to a subliminal graticule signal embedded as part of the watermark. A related system is shown in U.S. Pat. No. 5,949,055. By such arrangements, the encoding origin can generally be placed arbitrarily.) Indeed, in the case just cited, there are 16,384 possible origins (128*128) in the image that can be used. (Beyond the first 128×128 pixels, the tiling starts duplicating one of the 16,384 states.)

When an un-encoded image is decoded using the upper left hand pixel as the origin, a first set of watermark payload biases, as described above, may be revealed. If the origin is moved a single pixel to the right, a second set of watermark payload biases becomes evident. Likewise for each of the 16,384 possible origins.

For short payloads (e.g., up to 12 bits), it is probable that one or more of the phantom watermarks that may be discerned from the un-encoded image—starting with different origin points—will exactly yield the desired payload. For longer payloads, an origin can likely be selected that will exhibit a phantom bias for many of the payload bits. The task then becomes one of searching for the origin that yields suitable results. ("Suitable" here depends on the application or the preferences of the user. At one extreme it can mean finding the single origin within the 16,384 possible that yields the best possible phantom watermark results. If several origins yield the same, desired, phantom watermark biases, then each can be analyzed to discern the one yielding the best signal-to-noise ratio. In other applications, searching for a suitable origin can mean finding the first of perhaps several origins that yield the desired innate payload bit biases—regardless of whether there may be others that yield the same payload bit biases at better signal-to-noise ratios. In still other applications, a suitable origin can be any point that yields innate payload bit biases better than the normal upper-left-corner-pixel case. Etc.)

Except in limited circumstances (e.g., encoding a watermark in a single image that may be replicated billions of times, such as a banknote), an exhaustive search to find the single best origin may be so computationally burdensome as to be impractical. There may commonly be shortcuts and clues based on particular image characteristics and the encoding/decoding algorithms that can be employed to speed the search process.

The "origin" need not be a spatial location. It can be any other reference used in the encoding process. Quantization-based watermark encoding schemes, for example, may tailor the quantization levels in accordance with the particular innate biases of the image to encode desired watermark data.

In other embodiments, the suitability of an image to accept a particular watermark having a particular origin may best be ascertained by modifying the image slightly, and analyzing the modified image to determine watermark suitability. For example, a trial watermark (complete or incomplete, reduced amplitude or full amplitude) might be inserted into part or all of the image with a trial origin. The analyzing could then include an attempted reading of the watermark to yield a performance metric (e.g., signal-to-noise ratio). Based on the results thus achieved, the suitability of the image to host such watermark data with that particular origin can be assessed, and the process repeated, if desired, with a different origin. After thus characterizing the suitability of the image to accept watermarks with different origins, the image may be watermarked using the origin found to yield the best performance.

Although the foregoing discussion focused on changing the origin of the watermarking, other parameters can also be varied to effect the "match" between the innate image characteristics and the watermark data. One such parameter is image resolution. Another is image rotation. Yet another is compression.

Consider a vector graphic image that is "ripped" to yield a set of pixel data. The conversion can yield any desired pixel spacing (resolution), e.g., 600 dpi, 720 dpi, etc. The different resolutions will yield images that may be differently suited to host a particular set of watermark data. By analyzing the image at different resolutions, one may be found that provides innate image attributes that best tend to reinforce the desired watermark signal.

Similarly, with rotation. It is not essential that the image be encoded with the "top" oriented vertically. By rotating the image 90, 180, 270 degrees (or even to intermediate rotation states) prior to watermark encoding, a state may be found that provides image attributes tending to assist with the watermark encoding.

In still other applications, image attributes may be changed by corrupting the image through differing degrees of lossy compression/compression. To human observers, the results of different compression processes may be imperceptible, yet in the encoding domains, the resulting changes may make a particular image better- or worse-suited to encoding with a particular watermark. Again, various such modifications can be made to the original image to try and find a counterpart image that coincidentally has attributes that tend to reinforce the desired watermark signal.

Image modifications other than changing resolution, rotation, and compression can similarly be pursued; these three are exemplary only.

Figure 4:
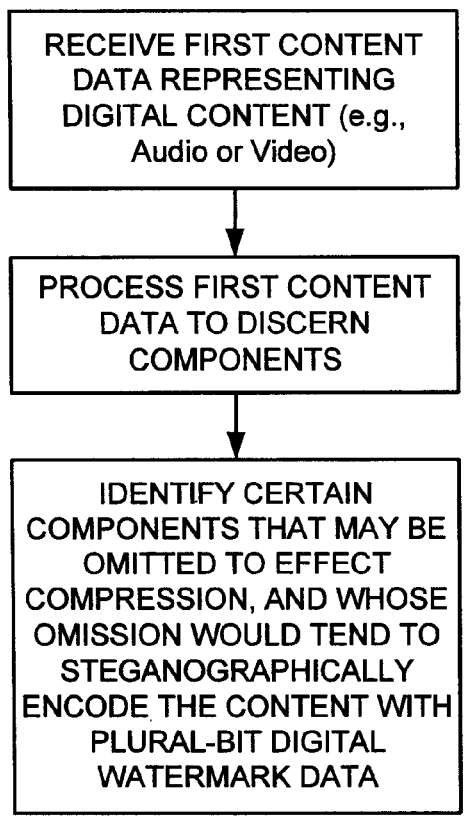
FIGS. 4 and 5 are flow charts illustrating methods according to other embodiments.
Figure 5:
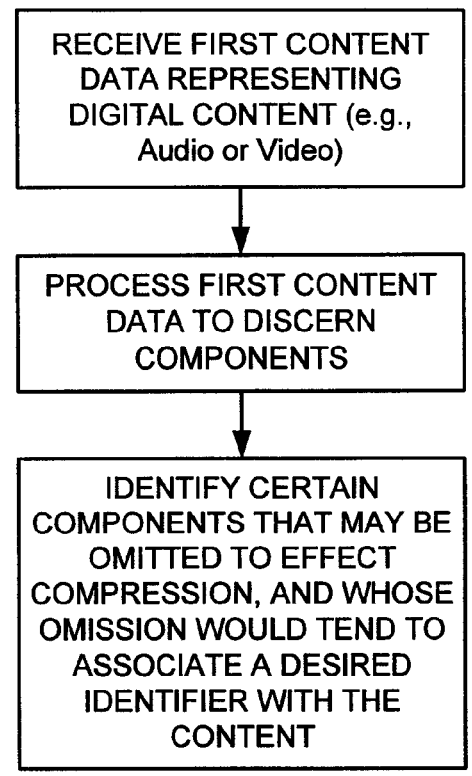

Reference was sometimes made above to image attributes that "coincidentally" tended to reinforce the desired watermarking signal. In particular cases, such attributes needn't always be left to chance. For example, in the compression-based approach just-discussed, compression algorithms have a great deal of flexibility in determining what image components to maintain, and which to omit as visually superfluous. The decision whether or not to omit certain image components can be made dependent, in part, on a priori knowledge of a watermark payload that is to be encoded (or retained) in the image, so as to optimize the innate biases in the decompressed image accordingly. Indeed, the entire watermark encoding process may be realized through a suitable compression algorithm that operates to retain or discard image information based at least in part on the watermark-related attributes of the resulting image after processing. Such arrangements are depicted, e.g., in FIGS. 4 and 5.

In still other embodiments, a multi-way optimization process may be performed. The original image can be analyzed to find which of several different origins yields the best results. The original image can then be modified (e.g., resolution, rotation, compression), and a variety of different origins again tried. Still further modifications can then be made, and the process repeated—all with a view to optimizing the image's innate suitability to convey a particular watermark.

As is familiar to those skilled in the arts, the foregoing methods may be performed using dedicated hardware, through use of a processor programmed in accordance with firmware or software, etc. In the latter case the processor may include a CPU and associated memory, together with appropriate input and output devices/facilities. The software can be resident on a physical storage medium such as a disk, and can be loaded into the processor's memory for execution. The software includes instructions causing the CPU to perform the analysis, search, evaluation, modification, and other processes detailed above.

The variety of watermarking techniques is vast; the technology detailed above is believed applicable to all. The variety of watermarking techniques is illustrated, e.g., by earlier cited patents/applications, and U.S. Pat. Nos. 5,930,469, 5,825,892, 5,875,249, 5,933,798, 5,916,414, 5,905,800, 5,905,819, and 5,915,027.

Having described and illustrated the principles of my work with reference to various embodiments thereof, it will be recognized that this technology can be modified in arrangement and detail without departing from such principles. For example, while the detailed embodiment particularly considered image data, the same principles are applicable to audio data. (The "origin"-based approaches would commonly use a temporal origin.) Similarly, the detailed techniques are not limited solely to use with digital watermarks in a narrow sense, but encompass other methods for processing an image to encode other information (e.g., for authentication or digital signature purposes, for image-within-an-image encoding, etc.—all regarded as within the scope of the term "watermark" as used herein.) Accordingly, I claim all such embodiments as may come within the scope and spirit of the following claims and equivalents thereto.

I claim:

1. A method comprising:
    discarding, using a processor, a first set of content components from content information, wherein the content information comprises plural content components;
    retaining a second set of content components; and
    steganographically encoding auxiliary information in the content information.

2. The method of claim 1, wherein the content information comprises visual information.

3. The method of claim 1, wherein discarding the first set of content components compresses the content information.

4. The method of claim 1, wherein discarding the first set of content components reinforces the encoding of the auxiliary information.

5. The method of claim 1, wherein discarding the first set of content components encodes one or more bits of the auxiliary information, and wherein the auxiliary information comprises a plurality of bits.

6. The method of claim 1, further comprising:
    discarding a third set of content components from a second content information, wherein the second content information comprises plural content components, and the second content information is a copy of the original content information;
    retaining a fourth set of content components in the second content information;
    steganographically encoding the auxiliary information in the second content information;
    determining a signal-to-noise ratio of the content information and the second content information; and
    selecting a suitable content information from the content information and the second content information based upon a highest signal-to-noise ratio.

7. The method of claim 6, wherein the first set of content components are selected based upon a first compression process, and wherein the third set of content components are selected based upon a second compression process.

8. The method of claim 1, wherein the first set of content components is determined based upon the auxiliary information to be encoded in the content information.

9. The method of claim 1, wherein discarding the first set of content components steganographically encodes the auxiliary information.

10. A system comprising:
    a processor configured to:
        discard a first set of content components from content information, wherein the content information comprises plural content components;
        retain a second set of content components; and
        steganographically encode auxiliary information in the content information.

11. The system of claim 10, wherein the content information is compressed by discarding the first set of content components.

12. The system of claim 10, wherein the encoding of the auxiliary information is reinforced by discarding the first set of content components.

13. The system of claim 10, wherein one or more bits of the auxiliary information are encoded by discarding the first set of content components, and wherein the auxiliary information comprises a plurality of bits.

14. The system of claim 10, wherein the first set of content components is determined based upon the auxiliary information to be encoded in the content information.

15. The system of claim 10, wherein the auxiliary information is encoded in the content information by the discarding of the first set of content components.

16. A non-transitory computer-readable medium having instructions stored thereon, the instructions comprising:
    instructions to discard a first set of content components from content information, wherein the content information comprises plural content components;

instructions to retain a second set of content components; and instructions to steganographically encode auxiliary information in the content information.

17. The non-transitory computer-readable medium of claim 16, wherein the content information is compressed by discarding the first set of content components.

18. The non-transitory computer-readable medium of claim 16, wherein the encoding of the auxiliary information is reinforced by discarding the first set of content components.

19. The non-transitory computer-readable medium of claim 16, wherein one or more bits of the auxiliary information are encoded by discarding the first set of content components, and wherein the auxiliary information comprises a plurality of bits.

20. The non-transitory computer-readable medium of claim 16, wherein the auxiliary information is encoded in the content information by the discarding of the first set of content components.

* * * * *

UNITED STATES PATENT AND TRADEMARK OFFICE
CERTIFICATE OF CORRECTION

PATENT NO.         : 8,103,053 B2                                    Page 1 of 1
APPLICATION NO.    : 12/821956
DATED              : January 24, 2012
INVENTOR(S)        : Rhoads It is certified that error appears in the above-identified patent and that said Letters Patent is hereby corrected as shown below:

Page 3, item (56), under "Other Publications", in Column 2, Line 33, delete "ANNOUNCEME-NT.GZ," and insert -- ANNOUNCEMENT.GZ, --.

Signed and Sealed this
Tenth Day of July, 2012

David J. Kappos
*Director of the United States Patent and Trademark Office*